Dec. 6, 1955   J. E. CHAMPION   2,725,860
FUEL INDUCTION SYSTEM
Filed Oct. 27, 1954   3 Sheets-Sheet 3
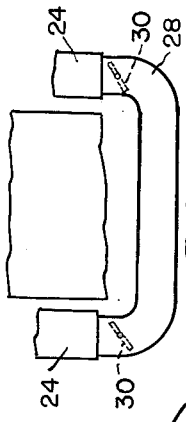
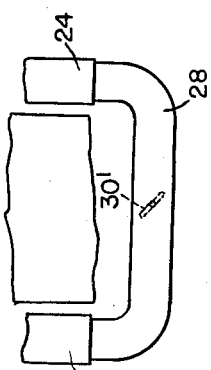
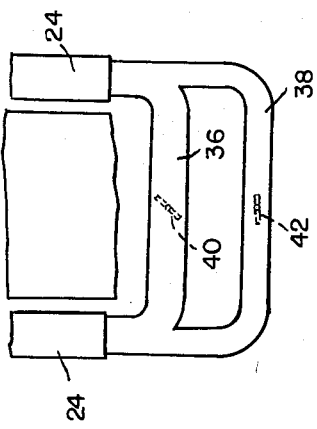
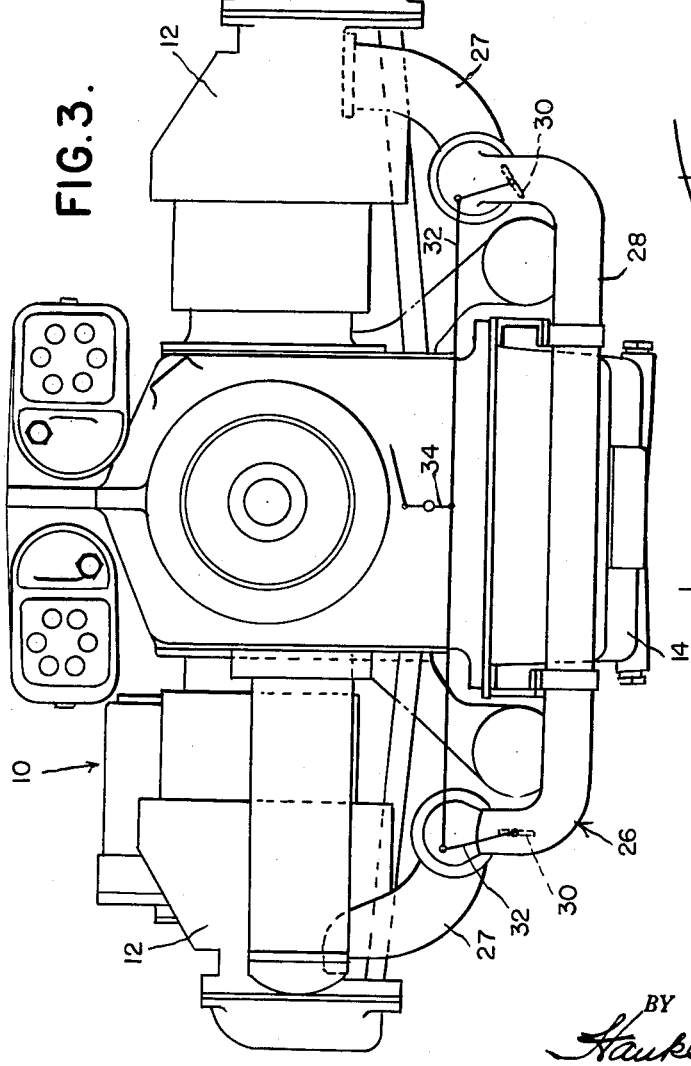
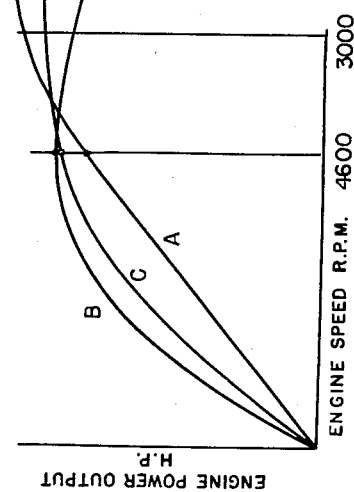
INVENTOR.
JAMES E. CHAMPION
BY
*Hauker Hardesty*
ATTORNEYS

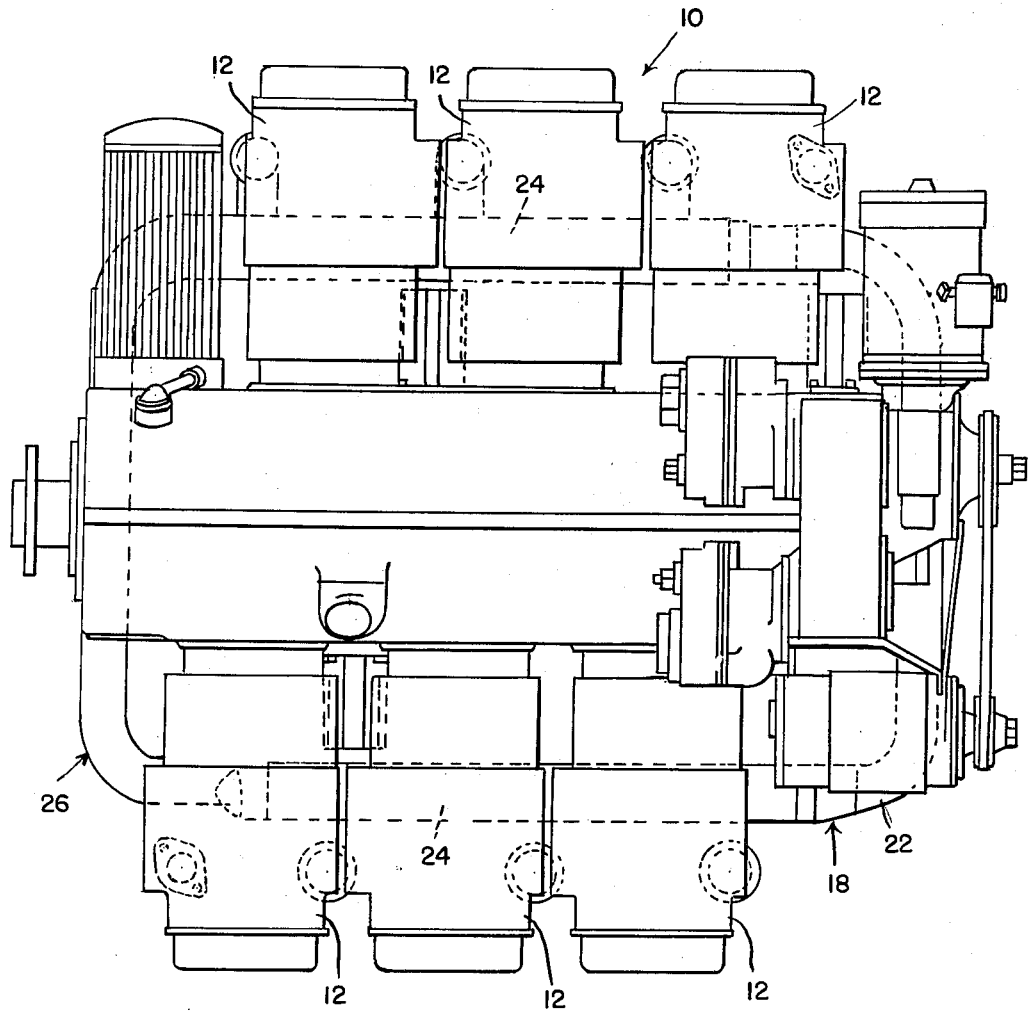

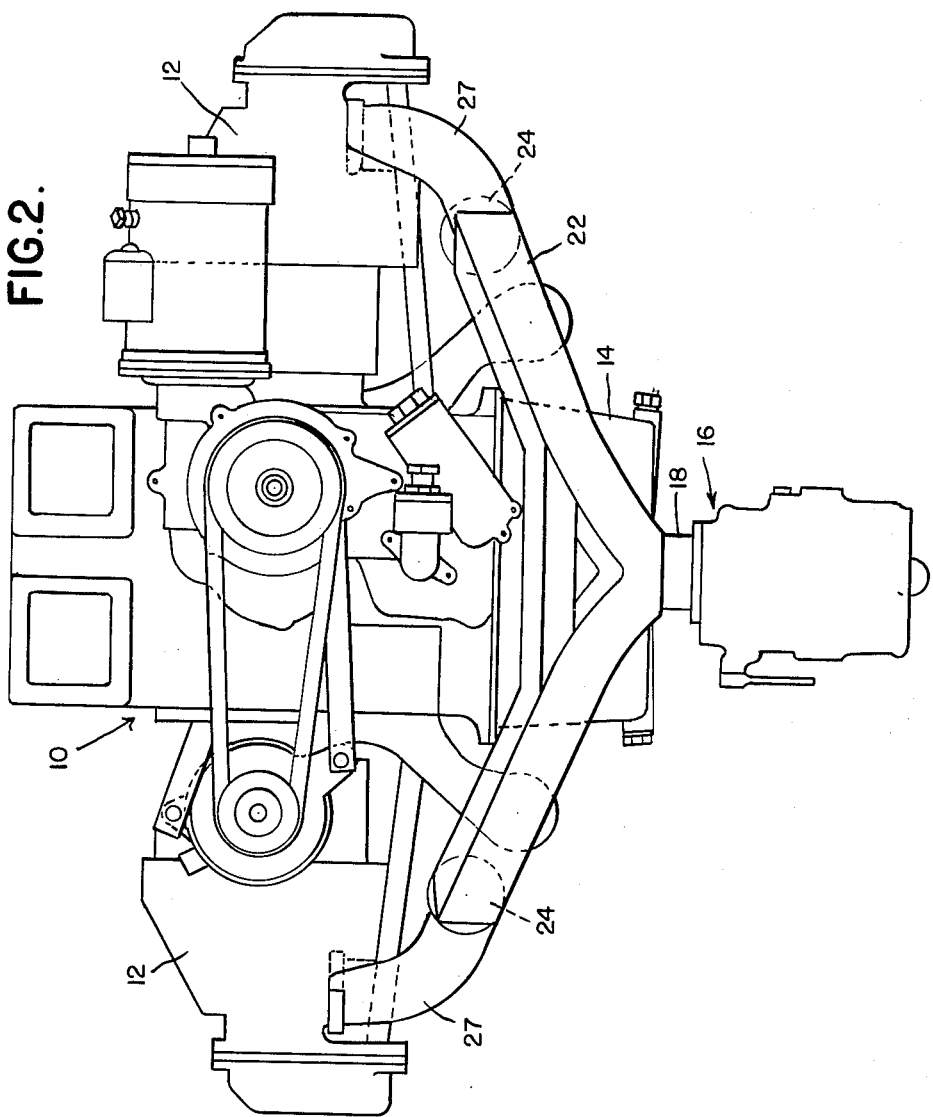

United States Patent Office 2,725,860
Patented Dec. 6, 1955

2,725,860

FUEL INDUCTION SYSTEM

James E. Champion, Muskegon, Mich., assignor to Continental Motors Corporation, Detroit, Mich., a corporation of Virginia Application October 27, 1954, Serial No. 464,951

8 Claims. (Cl. 123—56)

This invention relates to induction systems for multi-cylinder internal combustion engines, and particularly to an intake manifold structure for an aircraft engine having opposed banks of engine cylinders.

The air-fuel manifold system serving internal combustion aircraft engines not only has the problem of providing an induced air-fuel mixture at equalized pressures for each cylinder of the engine, but also must be so adaptable in its structure as to meet varying horsepower demands at various pressures in the system. An earlier filed copending patent application, Serial No. 408,789, filed February 8, 1954, by William A. Wiseman, entitled "Induction System for Internal Combustion Engines," and now Patent No. 2,705,479 granted April 5, 1955, deals with the first problem of providing equalized pressure throughout the induction system. The instant application deals with the second stated problem of adapting the fuel induction structure in providing a means to change the manifold characteristics on the ground or in the air for greater or lesser power demands of the engine.

The manifold structure made adaptable to provide the desired characteristics by valving the manifold in one of several ways, i. e. by arranging valves in the manifold structure whereby the internal pressures are controlled from without the engine, either manually or otherwise. By this means the take-off and cruising speeds of the aircraft, although proportional to engine R. P. M., is not directly proportional to fuel consumption, there being a substantial reduction in consumption at cruising speed as opposed to take-off, though the relative difference of the engine R. P. M. is small. This is accomplished by the valve means and their embodiment in the manifold structure of the engine.

It is an object of the invention to provide a valve means of one of several types and arrangements in the manifold structure of an internal combustion aircraft engine, whereby upon the exercise of valve controls in the manifold a greater engine torque or more power output is obtained at cruising speeds for producing improved engine operating characteristics.

For a more detailed understanding of the invention, reference may be had to the accompanying drawings illustrating preferred embodiments thereof, wherein like parts are referred to by like characters throughout the several views, and in which:

Fig. 1 is a top plan view of an internal combustion engine embodying the inventive improvement.

Fig. 2 is a front elevational view of the engine of Fig. 1, taken at the right end of the engine.

Fig. 3 is a rear elevational view of the engine of Fig. 1, taken at the left end of the engine.

Fig. 4 is a somewhat reduced fragmentary sectional view of a manifold structure showing one of the preferred valving arrangements.

Fig. 5 is a view similar to that in Fig. 4, showing a second preferred valving arrangement.

Fig. 6 is another view similar to that in Fig. 4, showing a third preferred valving arrangement.

Fig. 7 is a graph illustrating the relative horsepower to engine R. P. M. curves for each of the valve arrangements in Figs. 4, 5 and 6.

The multi-cylinder internal combustion engine 10 comprises a pair of opposed banks of cylinders 12, a crankcase 14, a carburetor 16, a primary fuel mixture distributing portion of the engine induction system, a main distribution system comprising an elongated looped intake manifold structure 18 consisting of a front transverse portion 22, two side runners 24 and a rear transverse tubular portion 26, or balance tube connecting the side runners at the rear end of the engine.

The first transverse portion 22 may consist of any suitable primary distribution structure and the one herein illustrated comprises a Y-shaped conjunction of the side runners 24 connected to an incoming fuel-air mixture flow from pipe 18, so that the flow is divided and distributed substantially uniformly to the banks of engine cylinders. The construction of this portion of the induction system is fully disclosed in the patent application above referred to.

The rear transverse tubular portion 26 may be arranged in any one of the several constructions shown in Figs. 3, 4, 5 and 6. The rear transverse tubular portion 26 is a pipe serving as a pressure balancing tube, and has an inside diameter which is less than that of the side runners 24. Port runners 27 lead from the side runners 24 to the cylinders 12.

Taking these up one at a time, the pressure balancing tube 26 of Fig. 3 comprises a single tubular element 28, in which are located two spaced apart valve elements 30, arranged transversely of the element 38 closely adjacent each of the side runners 24. The valve elements 30 are connected by suitable linkage means 32 to a pivoted lever 34, which is linked to a manual or automatic control means (not shown) that actuates the movement of the valve elements 30 to open or measurably close off the rear tubular portion 26 of the induction system. The adjustment of the valves 30 determines the rate of fuel mixture flow, thus controlling the rate of engine speed and efficiency in take-off or cruising ranges. Valves 30 may be arranged to operate in unison to open or close tubular element 28 at the same rate, as in Fig. 4, or to open one side and close the other side, as in Fig. 3. The variability of the valving effects of valves 30 is subject to engine horsepower needs per rate of engine speed.

In Fig. 5, a single valve element 30' is shown, providing for a simplified control of the fuel mixture flow through the induction system.

The rear transverse portion 26 of Fig. 6 comprises a pressure balancing tubular element 36 and a conjoined tubular element 38 of lesser diameter than that of tubular element 36, and thus tending to act as a constriction to the fuel-air mixture flow by comparison. In the double loop arrangement shown in Fig. 6, the valve element 40 of tube 36 and the valve element 42 of tube 38 may be controlled by means similar to that shown in Fig. 3, whereby the fuel-air mixture flow is subject to precise adjustment in the induction system closely adjacent the cylinders 12. For optimum control and adjustment, at take-off speed, the valves 40 and 42 are tied together so that the valve 40 opens tube 36 and valve 42 closes tube 38. Valves 40 and 42 may if desired be independently actuated.

It will be observed from the description of the induction system manifold structure given above that the manifold characteristics are subject to change and adjustment either on the ground or in the air. The advantages of such a structure are extensive. A principal advantage is in the fact that when the valve elements 30 of the tubular portion 28, Figs. 3 and 4, are arranged to open the rear transverse portion 26, the power curve is that represented by the curve marked "A" in Fig. 7. This curve is substantially a straight line curve up to peak performance which occurs roughly at take-off speed, where a particular engine is turning over at a rate of about 3000 R. P. M. In curve "A," the power output at 2600 R. P. M. is substantially below that at 3000 R. P. M. (take-off engine speed).

When the valves 30 are adjusted to close off or materially restrict the fuel-air mixture flow through rear transverse portion 26, as in Fig. 4, the power-speed curve is that shown by curve "B" in Fig. 7. Here, we see that the peak power is reached roughly at the cruising speed of 2600 R. P. M., with a falling off of power at engine speeds above 2600 R. P. M.

Curve "C" in Fig. 7 represents an adjustment of valve 30 in tubular portion 28 of Fig. 5, showing the power-speed relationship at take-off and cruising speeds. It will be observed that in adjusted valving, curve "C" the power output at the take-off speed (3000 R. P. M.) is somewhat below that of curve "A," and at cruising speed (2600 R. P. M.) power is substantially above that of curve "A" and closely approaching that for take-off speed.

The fuel saving, reduction in engine wear and extension of engine life, smoother performance and greater efficiency are advantages inherent in curves B and C, which is accomplished by the valving arrangements shown in the drawings and described above.

The double looped structure of Fig. 6 represents a combination of permanent and variable adjustments. The valves 40 and 42 in tubes 36 and 38 are the means whereby variable valving adjustment is achieved, and the reduced diameter of tube 38 over the diameter of tube 36 achieves a permanent type of adjustment in the fuel mixture flow.

It will be apparent to those skilled in the art to which this invention pertains that various modifications and changes may be made therein without departing from the spirit of the invention or from the scope of the appended claims.

I claim:

1. A fuel mixture inducting system for a multicylinder internal combustion engine having aligned banks of engine cylinders comprising an elongated continuous looped fuel mixture conducting structure extending longitudinally of the engine, port runners connecting said looped portion with each of said cylinders, the front end of said looped structure provided with a primary fuel mixture conducting portion through which said fuel mixture is introduced to the looped structure, the rear end portion of said elongated continuous conducting structure comprising a tubular section of lesser cross-sectional area than the side portions thereof, and valve means associated therewith to adjust the communication from one side runner to the other whereby to control power output relative to engine speed.

2. A fuel mixture inducting system for a multicylinder internal combustion engine having aligned banks of engine cylinders comprising an elongated continuous looped fuel mixture conducting structure extending longitudinally of the engine, port runners connecting said looped portion with each of said cylinders, the front end of said looped structure provided with a primary fuel mixture conducting portion through which said fuel mixture is introduced to the looped structure, the rear end portion of said elongated continuous conducting structure comprising a tubular portion of lesser cross-sectional area than the side portions thereof, and one or more valve means associated with and in said tubular section, actuated and controlled by means exterior of said looped structure whereby to control the power output relative to engine speed.

3. The fuel mixture inducting system defined in claim 2, in which said valve means comprises a pair of spaced apart valve shut-off elements arranged in said rear end tubular section closely adjacent each end thereof.

4. The fuel mixture inducting system defined in claim 2, in which said valve means comprises a pair of spaced apart butterfly valves.

5. A fuel mixture inducting system for a multi-cylinder internal combustion engine having aligned continuous looped cylinders comprising an elongated continuous looped fuel mixture conducting structure extending longitudinally of the engine, port runners connecting said looped portion with each of said cylinders, the front end of said looped structure provided with a primary fuel mixture conducting portion through which said fuel mixture is introduced to the looped structure, the rear end portion of said elongated continuous conducting structure comprising a tubular section of lesser cross-sectional area than the side portions thereof, and valve means associated with and in said tubular section, and actuated and controlled by means exterior of said looped structure to control the flow of fuel mixture in said looped structure, said valve means comprising a single valve element medially of the ends thereof.

6. A fuel mixture inducting system for a multi-cylinder internal combustion engine having aligned opposed banks of engine cylinders comprising an elongated continuous looped fuel mixture conducting structure extending longitudinally of the engine, port runners connecting said looped structure with each of said cylinders, the front end of said looped structure provided with a primary fuel mixture conducting portion through which said fuel mixture is introduced to the looped structure, the rear end portion of said elongated continuous conducting structure comprising a double looped tubular section, said section having a first tube of lesser cross-sectional area than the side portions of said looped structure, and a second tube of lesser cross-sectional area than that of said first tube, said first and second tubes arranged in parallel and having common connecting portions with the side portions of said looped structure, and valve means in each of said first and second tubes of said double looped tubular sections, said valve means being associated with means exterior of said looped structure to control the flow of fuel mixture in said looped structure.

7. A fuel mixture inducting system as defined in claim 4, in which said valve elements are interconnected for actuating in unison.

8. A fuel mixture induction system as defined in claim 2 in which said valve means are constructed and arranged to be adjusted to vary the effective cross-sectional area of said pressure balancing tube or tubes.

No references cited.